(12) United States Patent
Han et al.

(10) Patent No.: US 8,912,809 B2
(45) Date of Patent: Dec. 16, 2014

(54) METHODS AND APPARATUS FOR PERFORMING WAFER-LEVEL TESTING ON ANTENNA TUNING ELEMENTS

(75) Inventors: Liang Han, Sunnyvale, CA (US);
Matthew A. Mow, Los Altos, CA (US);
Ming Tsai, Cupertino, CA (US);
Thomas E. Biedka, San Jose, CA (US);
Robert W. Schlub, Cupertino, CA (US);
Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 13/494,663

(22) Filed: Jun. 12, 2012

(65) Prior Publication Data
US 2013/0328582 A1    Dec. 12, 2013

(51) Int. Cl.
*G01R 31/00*    (2006.01)
*G01R 31/26*    (2014.01)

(52) U.S. Cl.
USPC ............... 324/750.02; 324/750.01; 324/600; 324/762.03; 324/629; 324/637

(58) Field of Classification Search
CPC .... G01R 31/00; G01R 31/26; G01R 31/2841; G01R 35/005; G01R 1/06772; G01R 27/28; C01C 19/00
USPC .......... 324/601, 638, 750.01, 750.02, 755.01, 324/754.03, 762.01, 762.05, 762.03, 324/757.01, 757.04; 702/104, 117, 118; 445/87
See application file for complete search history.

(56) References Cited

U.S. PATENT DOCUMENTS

| | | | |
|---|---|---|---|
| 7,013,229 B2* | 3/2006 | Wong et al. | 702/107 |
| 7,279,920 B2* | 10/2007 | Kramer | 324/750.15 |
| 8,362,787 B1* | 1/2013 | Tsironis | 324/642 |
| 2008/0265929 A1* | 10/2008 | Burns et al. | 324/763 |
| 2010/0026315 A1* | 2/2010 | Simpson | 324/600 |
| 2010/0134133 A1 | 6/2010 | Pagani | |
| 2011/0037494 A1 | 2/2011 | Hung et al. | |
| 2011/0050267 A1* | 3/2011 | Pagani | 324/756.03 |
| 2011/0084887 A1* | 4/2011 | Mow et al. | 343/703 |
| 2011/0204906 A1 | 8/2011 | Tsironis et al. | |
| 2011/0291679 A1* | 12/2011 | Pagani | 324/750.01 |
| 2012/0053879 A1 | 3/2012 | Chang et al. | |
| 2012/0105086 A1 | 5/2012 | Bommer et al. | |
| 2012/0161784 A1* | 6/2012 | Benedikt | 324/612 |

OTHER PUBLICATIONS

Liang Han et al. U.S. Appl. No. 13/466,017, filed May 7, 2012.
Matthew A. Mow et al. U.S. Appl. No. 13/415,195, filed Mar. 8, 2012.

* cited by examiner

*Primary Examiner* — Arleen M Vazquez
*Assistant Examiner* — Neel Shah
(74) *Attorney, Agent, or Firm* — Treyz Law Group; Jason Tsai

(57) ABSTRACT

A test system for testing an antenna tuning element is provided. The test system may include a tester, a test fixture, and a probing structure. The probing structure may include probe tips configured to mate with corresponding solder bumps formed on a device under test (DUT) containing an antenna tuning element. The DUT may be tested in a shunt or series configuration. The tester may be electrically coupled to the test probe via first and second connectors on the test fixture. An adjustable load circuit that is coupled to the second connector may be configured in a selected state so that a desired amount of electrical stress may be presented to the DUT during testing. The tester may be used to obtain measurement results on the DUT. Systematic effects associated with the test structures may be de-embedded from the measured results to obtain calibrated results.

13 Claims, 15 Drawing Sheets

METHODS AND APPARATUS FOR PERFORMING WAFER-LEVEL TESTING ON ANTENNA TUNING ELEMENTS

BACKGROUND

This relates generally to wireless communications circuitry, and more particularly, to electronic devices having wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry.

To satisfy consumer demand for small form factor wireless devices, manufacturers are continually striving to implement wireless communications circuitry such as antenna components using compact structures. However, it can be difficult to fit conventional antenna structures into small devices. For example, antennas that are confined to small volumes often exhibit narrower operating bandwidths than antennas that are implemented in larger volumes. If the bandwidth of an antenna becomes too narrow, the antenna will not be able to cover all communications bands of interest.

In view of these considerations, it would be desirable to provide antenna tuning elements that allow the antenna to cover a wider range of frequency bands. Moreover, it may be desirable to provide ways for testing the performance of such types of tuning elements.

SUMMARY

A wireless electronic device may include storage and processing circuitry and wireless communications circuitry. The wireless communications circuitry may include a baseband processor, transceiver circuitry, and at least one antenna. The antenna may include an antenna resonating element and at least one antenna tuning element. The antenna tuning element may be used to help the antenna cover a wider range of communications frequencies than would otherwise be possible.

The tunable element may include radio-frequency switches, continuously or semi-continuously tunable resistive/inductive/capacitive components forming using integrated circuits, discrete surface mount components, or other suitable conductive structures, and other load circuits configured to provide desired impedance characteristics for the antenna at selected frequencies.

In accordance with an embodiment of the present invention, a test system may be provided that includes a test host (e.g., a personal computer), a radio-frequency tester (e.g., a vector network analyzer, spectrum analyzer, or other types of signal generator and receiver), a test fixture, a probing structure, cabling (e.g., coaxial cables) for coupling the tester to the test fixture, and other test equipment. The test system may be used to perform wafer-level testing on devices (or dies) under test, each of which contains an antenna tuning element having first and second terminals.

A device under test (DUT) may be operated and tested in a shunt or series configuration. During testing, the test fixture that supports the probing structure may be lowered so that contacts on the probing structure mate with corresponding solder bumps on the DUT. The test fixture may include first and second ports that are coupled to the radio-frequency tester. When the DUT is tested in the shunt configuration, the first terminal of the antenna tuning element may be electrically coupled to the first and second ports of the test fixture while the second terminal of the DUT may be coupled to ground. When the DUT is tested in the series configuration, the first terminal of the antenna tuning element may be coupled to the first port while the second terminal of the antenna tuning element may be coupled to the second port, where the DUT is coupled in series between the first and second ports of the test fixture.

An adjustable load circuit mounted on the text fixture may be coupled to the second port. During testing, the adjustable load circuit may be placed in a selected state so that the DUT is presented with a predetermined level of voltage and/or current stress that serves to emulate the amount of stress that the antenna tuning element experiences during normal device operation. When testing the DUT in different radio-frequency bands, the adjustable load circuit may be placed in different respective states to switch desired load values into use so that the DUT is tested under a calibrated amount of stress.

Further features of the present invention, its nature and various advantages will be more apparent from the accompanying drawings and the following detailed description.

DETAILED DESCRIPTION

Figure 1:
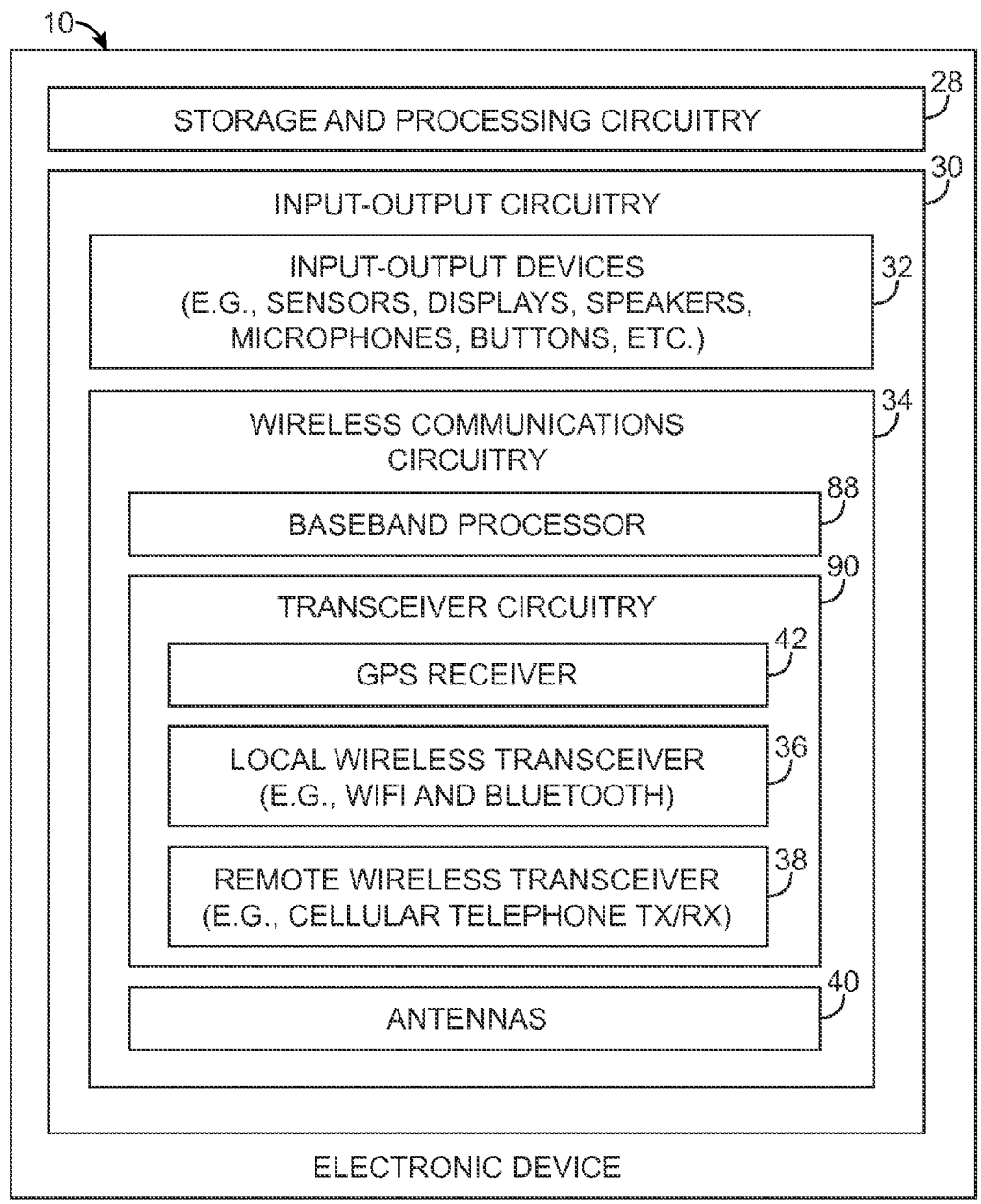
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands. Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth® links at 2.4 GHz, etc.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, and the "4G" Long Term Evolution (LTE) protocol, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 90 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data traffic.

Transceiver circuitry 90 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

As shown in FIG. 1, wireless communications circuitry 34 may also include baseband processor 88. Baseband processor may include memory and processing circuits and may also be considered to form part of storage and processing circuitry 28 of device 10.

Baseband processor 88 may be used to provide data to storage and processing circuitry 28. Data that is conveyed to circuitry 28 from baseband processor 88 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 88 and, in response, storage and processing circuitry 28 (or, if desired, baseband processor 58) may issue control commands for controlling wireless circuitry 34. For example, baseband processor 88 may issue commands that direct transceiver circuitry 90 to switch into use desired transmitters/receivers and antennas.

Antenna diversity schemes may be implemented in which multiple redundant antennas are used in handling communications for a particular band or bands of interest. In an antenna diversity scheme, storage and processing circuitry 28 may select which antenna to use in real time based on signal strength measurements or other data. In multiple-input-multiple-output (MIMO) schemes, multiple antennas may be used in transmitting and receiving multiple data streams, thereby enhancing data throughput.

Figure 2:
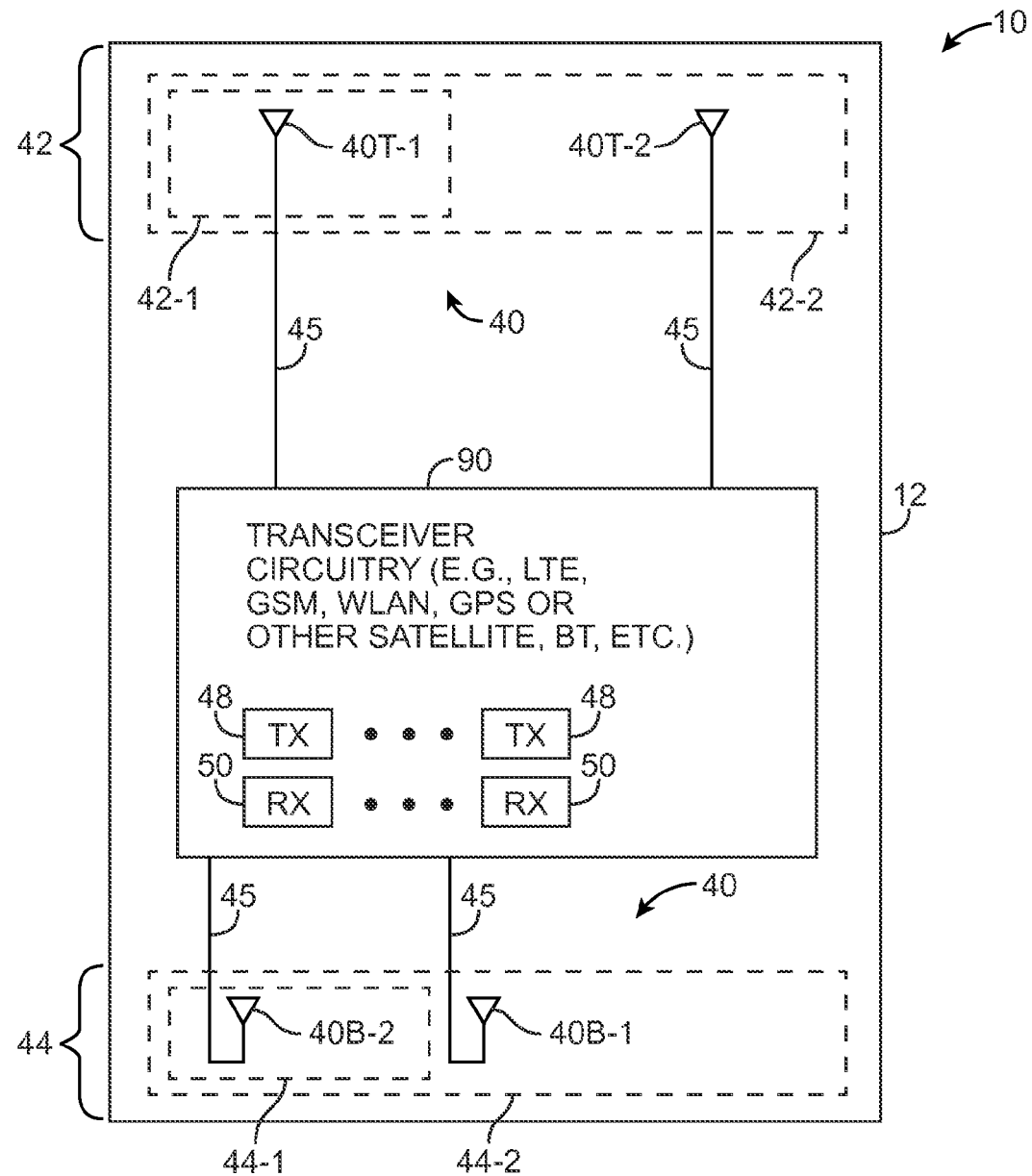
FIG. 2 is a diagram showing how radio-frequency transceiver circuitry may be coupled to one or more antennas within an electronic device of the type shown in FIG. 1 in accordance with an embodiment of the present invention.

Illustrative locations in which antennas 40 may be formed in device 10 are shown in FIG. 2. As shown in FIG. 2, electronic device 10 may have a housing such as housing 12. Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12. For example, housing 12 may include metal housing sidewalls, peripheral conductive members such as band-shaped members (with or without dielectric gaps), conductive bezels, and other conductive structures that may be used in forming antenna structures 40.

As shown in FIG. 2, antenna structures 40 may be coupled to transceiver circuitry 90 by paths such as paths 45. Paths 45 may include transmission line structures such as coaxial cables, microstrip transmission lines, stripline transmission lines, etc. Impedance matching circuitry, filter circuitry, and switching circuitry may be interposed in paths 45 (as examples). Impedance matching circuitry may be used to ensure that antennas 40 are efficiently coupled to transceiver circuitry 90 in desired frequency bands of interest. Filter circuitry may be used to implement frequency-based multiplexing circuits such as diplexers, duplexers, and triplexers. Switching circuitry may be used to selectively couple antennas 40 to desired ports of transceiver circuitry 90. For example, a switch may be configured to route one of paths 45 to a given antenna in one operating mode. In another operating mode, the switch may be configured to route a different one of paths 45 to the given antenna. The use of switching circuitry between transceiver circuitry 90 and antennas 40 allows device 10 to switch particular antennas 40 in and out of use depending on the current performance associated with each of the antennas.

In a device such as a cellular telephone that has an elongated rectangular outline, it may be desirable to place antennas 40 at one or both ends of the device. As shown in FIG. 2, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-2. Similarly, an antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as radio-frequency transmitters 48 and receivers such as radio-frequency receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals, power amplifier circuits for increasing transmitted signal power, low noise amplifier circuits for increasing signal power in received signals, other suitable wireless communications circuits, and combinations of these circuits).

Figure 3:
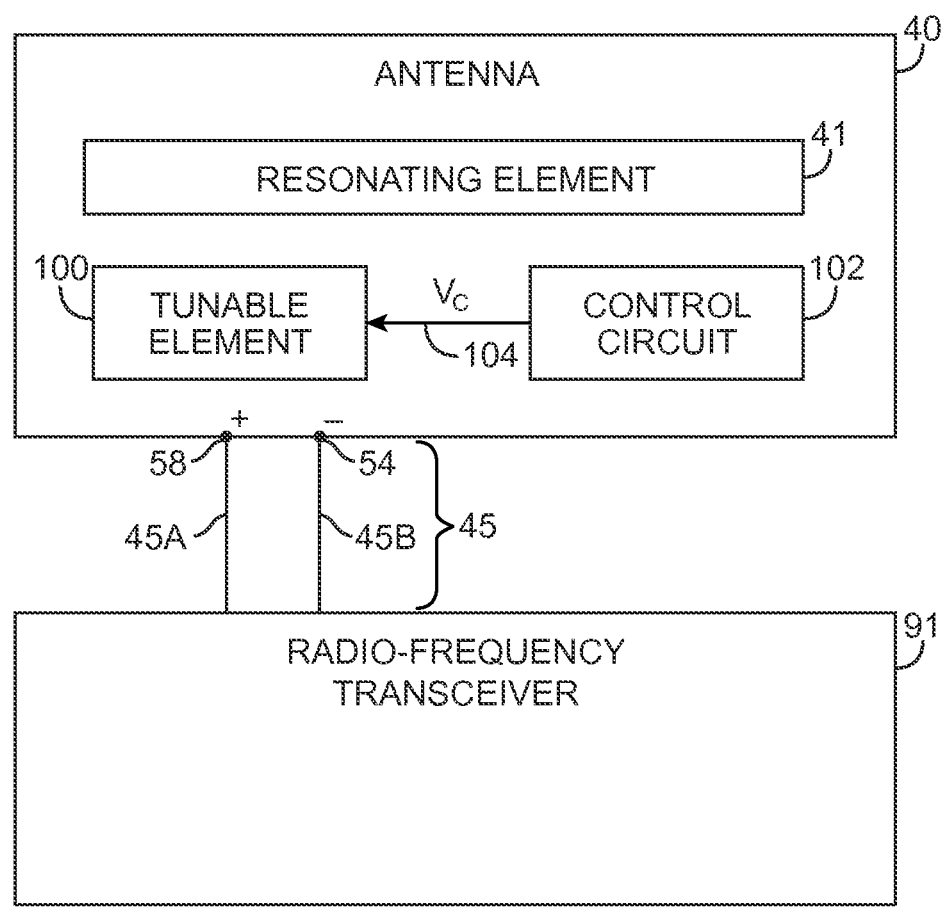
FIG. 3 is a circuit diagram showing how an antenna in the electronic device of FIG. 1 may be coupled to radio-frequency transceiver circuitry in accordance with an embodiment of the present invention.

FIG. 3 is a diagram showing how radio-frequency path 45 may be used to convey radio-frequency signals between an antenna 40 and radio-frequency transceiver 91. Antenna 40 may be one of the antennas of FIG. 2 (e.g., antenna, 40T-1, 40T-2, 40B-1, 40B-2, or other antennas). Radio-frequency transceiver 91 may include receivers and/or transmitters in transceiver circuitry 90, wireless local area network transceiver 36 (e.g., a transceiver operating at 2.4 GHz, 5 GHz, 60 GHz, or other suitable frequency), cellular telephone transceiver 38, or other radio-frequency transceiver circuitry for receiving and/or transmitting radio-frequency signals.

Conductive path 45 may include one or more transmission lines such as one or more segments of coaxial cable, one or more segments of microstrip transmission line, one or more segments of stripline transmission line, or other transmission line structures. Path 45 may include a first conductor such as signal line 45A and may include a second conductor such as ground line 45B. Antenna 40 may have an antenna feed with a positive antenna feed terminal 58 (+) that is coupled to signal path 45A and a ground antenna feed terminal 54 (−) that is coupled to ground path 45B. If desired, circuitry such as filters, impedance matching circuits, switches, amplifiers, and other radio-frequency circuits may be interposed within path 45.

As shown in FIG. 3, antenna 40 may include a resonating element 41 and antenna tuning circuitry. Resonating element 41 may be formed from a loop antenna structure, patch antenna structure, inverted-F antenna structure, slot antenna structures, planar inverted-F antenna structures, helical antenna structures, hybrids of these designs, etc. The use of antenna tuning circuitry may help device 10 cover a wider range of communications frequencies than would otherwise be possible.

In general, it is desirable for device 10 to be able to exhibit wide band coverage (e.g., for device 10 to be able to support operation in multiple frequency bands corresponding to different radio access technologies). For example, it may be desirable for antenna 40 to be capable of operating in a higher frequency band that covers the GSM sub-bands at 1800 MHz and 1900 MHz and the data sub-band at 2100 MHz, a first lower frequency band that covers the GSM sub-bands at 850 MHz and 900 MHz, and a second lower frequency band that covers the LTE band at 700 MHz, the GSM sub-bands at 710 MHz and 750 MHz, the UMTS sub-band at 700 MHz, and other desired wireless communications bands.

The band coverage of antenna 40 may be limited by its volume (i.e., the amount of space that is occupied by antenna 40 within housing 12). For an antenna having a given volume, a higher band coverage (or bandwidth) results in a decrease in gain (e.g., the product of maximum gain and bandwidth is constant). As a result, increasing the volume of antenna 40 will generally increase its band coverage. Increasing the volume of antennas, however, may not always be feasible if a small form factor is desired.

To satisfy consumer demand for small form factor wireless devices, one or more of antennas 40 may be provided with antenna tuning circuitry. The antenna tuning circuitry may include a radio-frequency tunable component such as tunable component (sometimes referred to as an adjustable antenna tuning element) 100 and an associated control circuitry such as control circuit 102 (see, e.g., FIG. 3). Tunable element 100 and/or control circuit 102 may sometimes be formed as an integral part of antenna resonating element 41 or as a separate discrete surface-mount component that is attached to antenna resonating element 41.

For example, antenna tuning element 100 may include switching circuitry based on one or more switches or continuously tunable load components. Control circuit 102 may be used to place tunable element 100 in the desired state by sending appropriate control signals Vc via path 104. The switching circuitry may, for example, include a switch that can be placed in an open or closed position. When the switch is placed in its open position (e.g., when control signal Vc has a first value), antenna 40 may exhibit a first frequency response. When the switch is placed in its closed position (e.g., when control signal Vc has a second value that is different than the first value), antenna 40 may exhibit a second frequency response. By using an antenna tuning scheme of this type, a relatively narrow bandwidth (and potentially compact) design can be used for antenna 40, if desired.

Figure 4A:
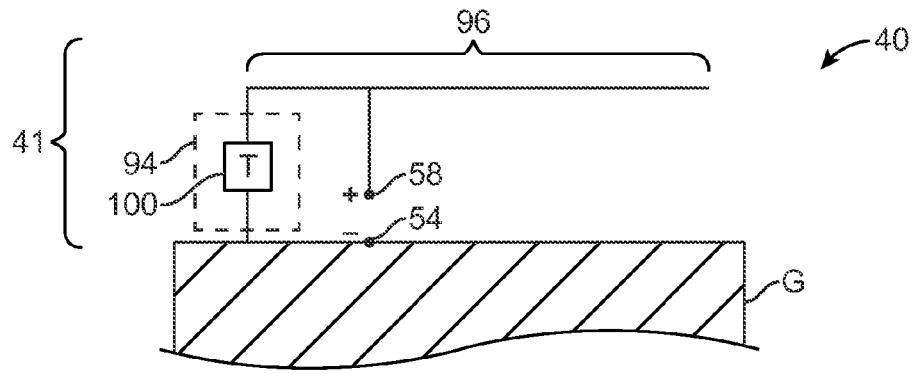
FIGS. 4A, 4B, and 4C are schematic diagrams of an illustrative inverted-F antenna containing antenna tuning elements in accordance with an embodiment of the present invention.

In one suitable embodiment of the present invention, antenna 40 may be an inverted-F antenna. FIG. 4A is a schematic diagram of an inverted-F antenna that may be used in device 10. As shown in FIG. 4A, inverted-F antenna 40 may have an antenna resonating element such as antenna resonating element 41 and a ground structure such as ground G. Antenna resonating element 41 may have a main resonating element arm such as arm 96. Short circuit branch such as shorting path 94 may couple arm 96 to ground G. An antenna feed may contain positive antenna feed terminal 58 (+) and ground antenna feed terminal 54 (−). Positive antenna feed terminal 58 may be coupled to arm 96, whereas ground antenna feed terminal 54 may be coupled to ground G. Arm 96 in the FIG. 4A example is shown as being a single straight segment. This is merely illustrative. Arm 96 may have multiple bends with curved and/or straight segments, if desired.

In the example of FIG. 4A, inverted-F antenna 40 may include an antenna tuning element 100 interposed in shorting path 94. Antenna tuning element 100 may, for example, be a switchable impedance matching network, a switchable inductive network, a continuously tunable capacitive circuit, etc.

Figure 4B:
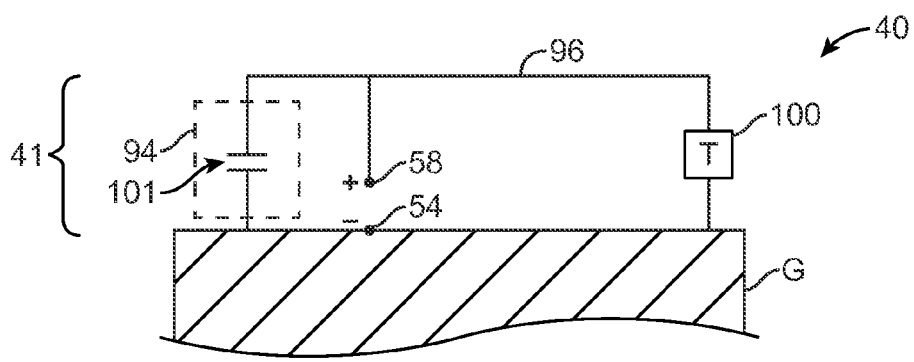

In another suitable arrangement of the present invention, resonating element 41 of inverted-F antenna 40 may include an antenna tuning element 100 coupled between the extended portion of resonating arm 96 and ground G (see, e.g., FIG. 4B). In such an arrangement, a capacitive structure such as capacitor 101 may be interposed in shorting path 94 so that antenna tuning circuit 100 is not shorted to ground at low frequencies. In the example of FIG. 4B, antenna tuning element 100 may be a switchable inductor, a continuously tunable capacitive/resistive circuit, etc.

Figure 4C:
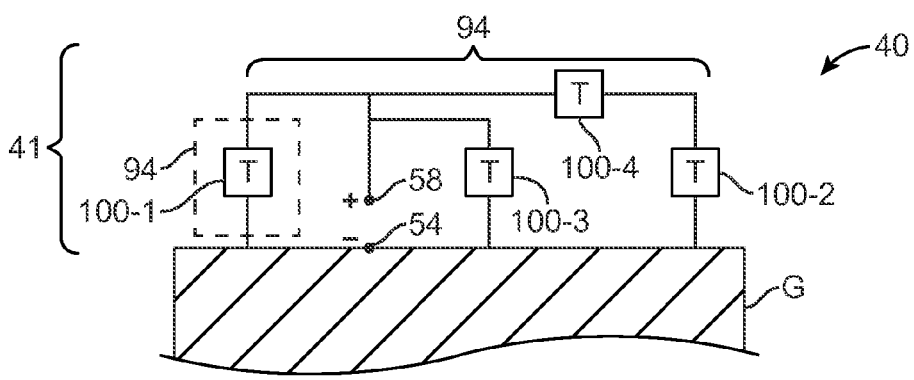

In general, antenna 40 may include any number of antenna tuning elements 100. As shown in FIG. 4C, short circuit branch 94 may include at least one tunable element 100-1 that couples arm 96 to ground. Tunable element 100-1 may be a switchable inductive path, as an example (e.g., element 100-1 may be activated to short arm 96 to ground). If desired, antenna tuning element 100-3 may be coupled in parallel with the antenna feed between positive antenna feed terminal 58 and ground feed terminal 54. Tunable element 100-3 may be an adjustable impedance matching network circuit, as an example.

As another example, antenna tuning element 100-4 may be interposed in antenna resonating arm 96. Antenna tuning element 100-4 may be a continuously adjustable variable capacitor (as an example). If desired, additional tuning elements such tuning element 100-2 (e.g., continuously tunable or semi-continuously tunable capacitors, switchable inductors, etc.) may be coupled between the extended portion of arm 96 to ground G.

The placement of these tuning circuits 100 in FIGS. 4A, 4B, and 4C is merely illustrative and do not serve to limit the scope of the present invention. Additional capacitors and/or inductors may be added to ensure that each antenna tuning circuit 100 is not shorted circuited to ground at low frequencies (e.g., frequencies below 100 MHz). In general, antennas 40 in device 10 may include antennas with resonating elements that are formed from loop antenna structures, patch antenna structures, inverted-F antenna structures, slot antenna structures, planar inverted-F antenna structures, helical antenna structures, hybrids of these designs, etc. At least a portion of antennas 40 in device 10 may contain at least one antenna tuning element 100 (formed at any suitable location on the antenna) that can be adjusted so that wireless circuitry 34 may be able to cover the desired range of communications frequencies.

Figure 5A:
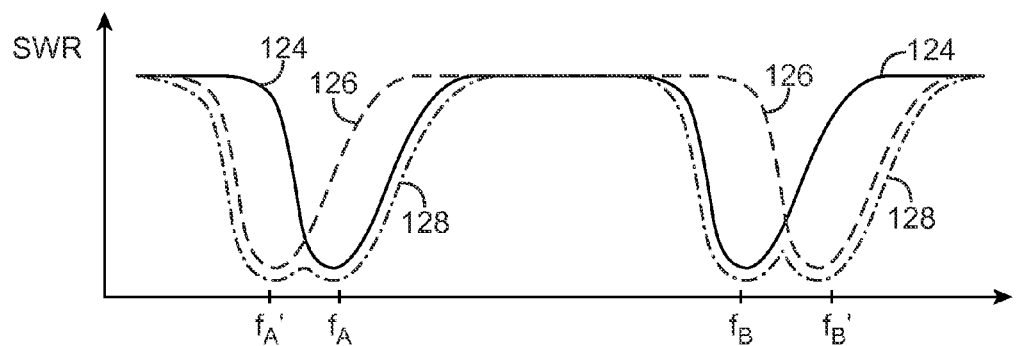
FIGS. 5A and 5B are plots showing how antennas containing tuning elements may be used to cover multiple communications bands of interest in accordance with an embodiment of the present invention.

By dynamically controlling antenna tuning elements 100, antenna 40 may be able to cover a wider range of radio-frequency communications frequencies than would otherwise be possible. A standing-wave-ratio (SWR) versus frequency plot such as SWR plot of FIG. 5A illustrates the band tuning capability for antenna 40. As shown in FIG. 5A, solid SWR frequency characteristic curve 124 corresponds to a first antenna tuning mode in which antenna 40 exhibits satisfactory resonant peaks at low-band frequency $f_A$ (e.g., to cover the 850 MHz band) and high-band frequency $f_B$ (e.g., to cover the 1900 MHz band). In the first antenna tuning mode, the antenna tuning elements 100 of antenna 40 may be placed in a first configuration (e.g., antenna tuning elements 100 may be provided with a first set of control signals).

Dotted SWR frequency characteristic curve 126 corresponds to a second antenna tuning mode in which the antennas of device 10 exhibits satisfactory resonant peaks at low-band frequency $f_A'$ (e.g., to cover the 750 MHz band) and high-band frequency $f_B'$ (e.g., to cover the 2100 MHz band). In the second antenna tuning mode, the antenna tuning elements 100 may be placed in a second configuration that is different than the first configuration (e.g., antenna tuning circuits 100 may be provided with a second set of control signals that is different than the first set of control signals).

If desired, antenna 40 may be placed in a third antenna tuning mode in which antenna 40 exhibits satisfactory resonant peaks at both low-band frequencies $f_A'$ and $f_A$ (e.g., to cover both the 750 and 850 MHz bands) and at high-band frequencies $f_B$ and $f_B'$ (e.g., to cover both the 1900 and 2100 MHz bands), as shown by SWR characteristic curve 128. In the third antenna tuning mode, the antenna tuning elements 100 may be placed in a third configuration that is different than the first and second configurations (e.g., antenna tuning elements 100 may be provided with a third set of control signals that is different than the first and second sets of control signals). A combination of tuning methods may be used so that the resonance curve 128 exhibits broader frequency ranges than curves 124 and 126.

Figure 5B:
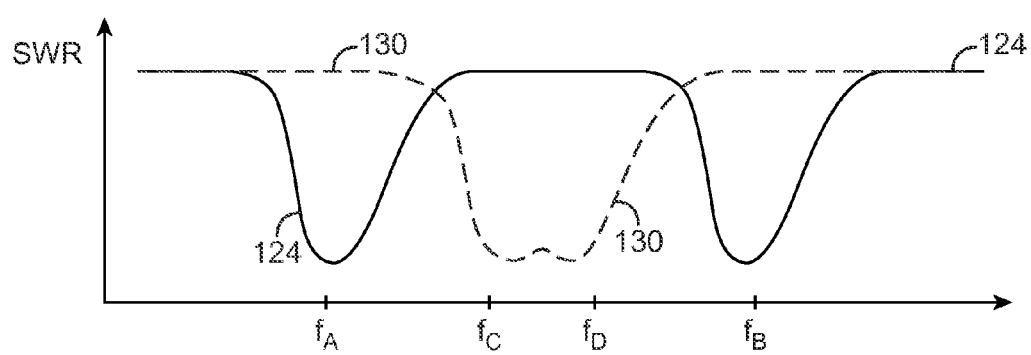

In another suitable arrangement, antenna 40 may be placed in a fourth antenna tuning mode in which antenna 40 exhibits satisfactory resonant peaks at mid-band frequencies $f_C$ and $f_D$ (e.g., to cover frequencies between the low and high bands), as shown by SWR characteristic curve 130 of FIG. 5B. In the fourth antenna tuning mode, the antenna tuning circuits 100 may yet be placed in another different configuration. The SWR curves of FIGS. 5A and 5B are merely illustrative and do not serve to limit the scope of the present invention. In general, antenna(s) 40 may include antenna tuning circuits 100 that enable device 10 to transmit and receive wireless signals in any suitable number of radio-frequency communications bands.

Figure 6A:
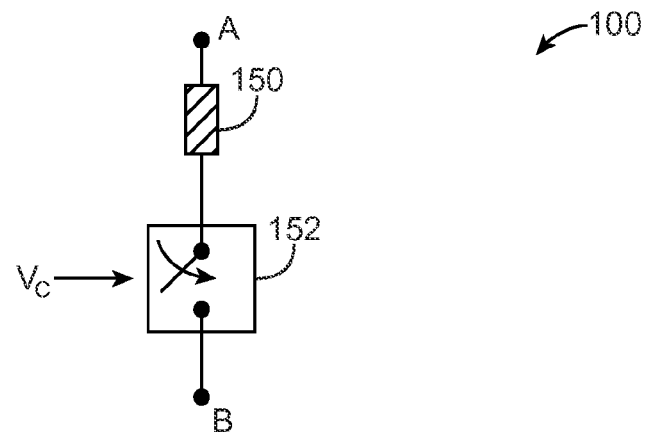
FIGS. 6A and 6B are circuit diagrams of illustrative switchable load circuits that may be used as antenna tuning elements in accordance with an embodiment of the present invention.

Antenna tuning element 100 may be any switchable or tunable electrical component that can be adjusted in real time. Antenna tuning element 100 may have a first terminal A and a second terminal B that may be coupled to desired locations on antenna resonating element 41 and a third terminal operable to receive control signal Vc from control circuit 102. FIG. 6A shows one suitable circuit implementation of tunable element 100. As shown in FIG. 6A, element 100 may include a radio-frequency switch 150 and a load circuit 152 coupled in series between terminals A and B. Switch 152 may be implemented using a p-i-n diode, a gallium arsenide field-effect transistor (FET), a microelectromechanical systems (MEMs) switch, a metal-oxide-semiconductor field-effect transistor (MOSFET), a high-electron mobility transistor (HEMT), a pseudomorphic HEMT (PHEMT), a transistor formed on a silicon-on-insulator (SOI) substrate, etc. The state of the switch can be controlled using signal Vc generated from control circuit 102 (see, e.g., FIG. 3). For example, a high Vc will turn on or close switch 402 whereas a low Vc will turn off or open switch 402.

Load circuit 152 may be formed from one or more electrical components. Components that may be used as all or part of circuit 152 include resistors, inductors, and capacitors. Desired resistances, inductances, and capacitances for circuit 152 may be formed using integrated circuits, using discrete components (e.g., a surface mount technology inductor) and/or using dielectric and conductive structures that are not part of a discrete component or an integrated circuit. For example, a resistance can be formed using thin lines of a resistive metal alloy, capacitance can be formed by spacing two conductive pads close to each other that are separated by a dielectric, and an inductance can be formed by creating a conductive path (e.g., a transmission line) on a printed circuit board.

Figure 6B:
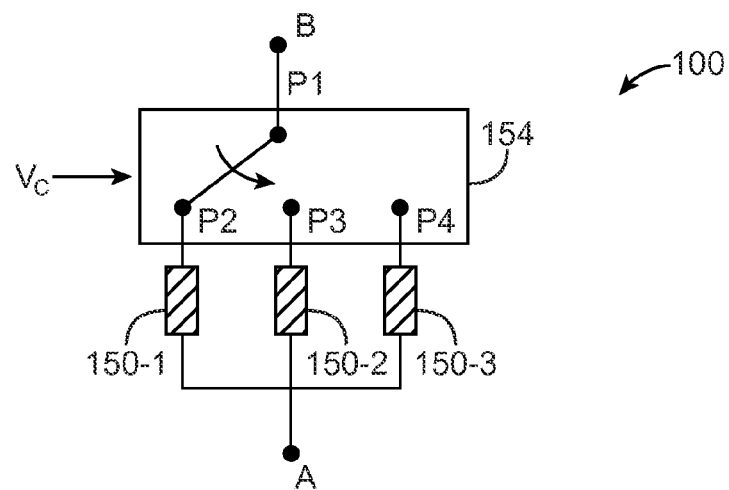

In another suitable arrangement, tunable element 100 may include a switch 154 (e.g., a single-pole triple-throw radio-frequency switch) and multiple load circuits 150-1, 150-2, and 150-3. As shown in FIG. 6B, switch 154 may have ports P1, P2, P3, and P4. Terminal B of tunable element 100 may be coupled to port P1 while terminal A of tunable element 100 may be coupled to port P2 via circuit 150-1, to port P3 via circuit 150-2, and to port P4 via circuit 150-3. As described previously, load circuits 150-1, 150-2, and 150-3 may include any desired combination of resistive components, inductive components, and capacitive components formed using integrated circuits, discrete components, or other suitable conductive structures. Switch 154 may be controlled using signal Vc generated by control circuit 102. For example, switch 154 may be configured to couple port P1 to P2 when Vc is at a first value, to couple port P1 to P3 when Vc is at a second value that is different than the first value, and to couple port P1 to P4 when Vc is at a third value that is different than the first and second values.

The example of FIG. 6B in which tunable element 100 includes three impedance loading circuits is merely illustrative and does not serve to limit the scope of the present invention. If desired, tunable element 100 may include a radio-frequency switch having any number of ports configured to support switching among any desired number of loading circuits. If desired, switch 154 may be configured such that more than one of the multiple loading circuits 150 may be coupled to port P1 in parallel.

Figure 6C:
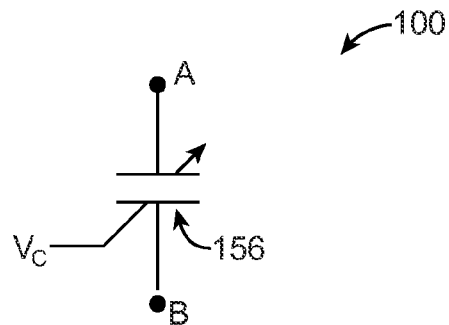
FIG. 6C is a circuit diagram of an illustrative variable capacitor circuit that may be used as an antenna tuning element in accordance with an embodiment of the present invention.

In another suitable arrangement, tunable element 100 may include a variable capacitor circuit 156 (sometimes referred to as a varactor). As shown in FIG. 6C, varactor may have first terminal A, second terminal B, and a control terminal operable to receive signal Vc from control circuit 300. Control circuit 102 may be adjusted so that Vc adjusts the capacitance of varactor 156 to the desired amount. Varactor 156 may be formed using integrated circuits, one or more discrete components (e.g., SMT components), etc. In general, varactor 156 may be continuously variable capacitors or semi-continuously adjustable capacitors.

Having antenna tuning element 100 as part of antenna 40 introduces an additional component that needs to be characterized, because the design of antenna tuning element 100 can substantially impact the antenna performance of device 10. For example, the position at which element 100 is placed relative to the antenna feed terminals, the materials with which element 100 is constructed, the orientation of element 100 within device 10, and other design factors associated with element 100 can affect the wireless operation of device 10. It may therefore be desirable to have a way of characterizing the performance of antenna tuning element 100 to provide guidance in the antenna design of device 10.

Figure 7:
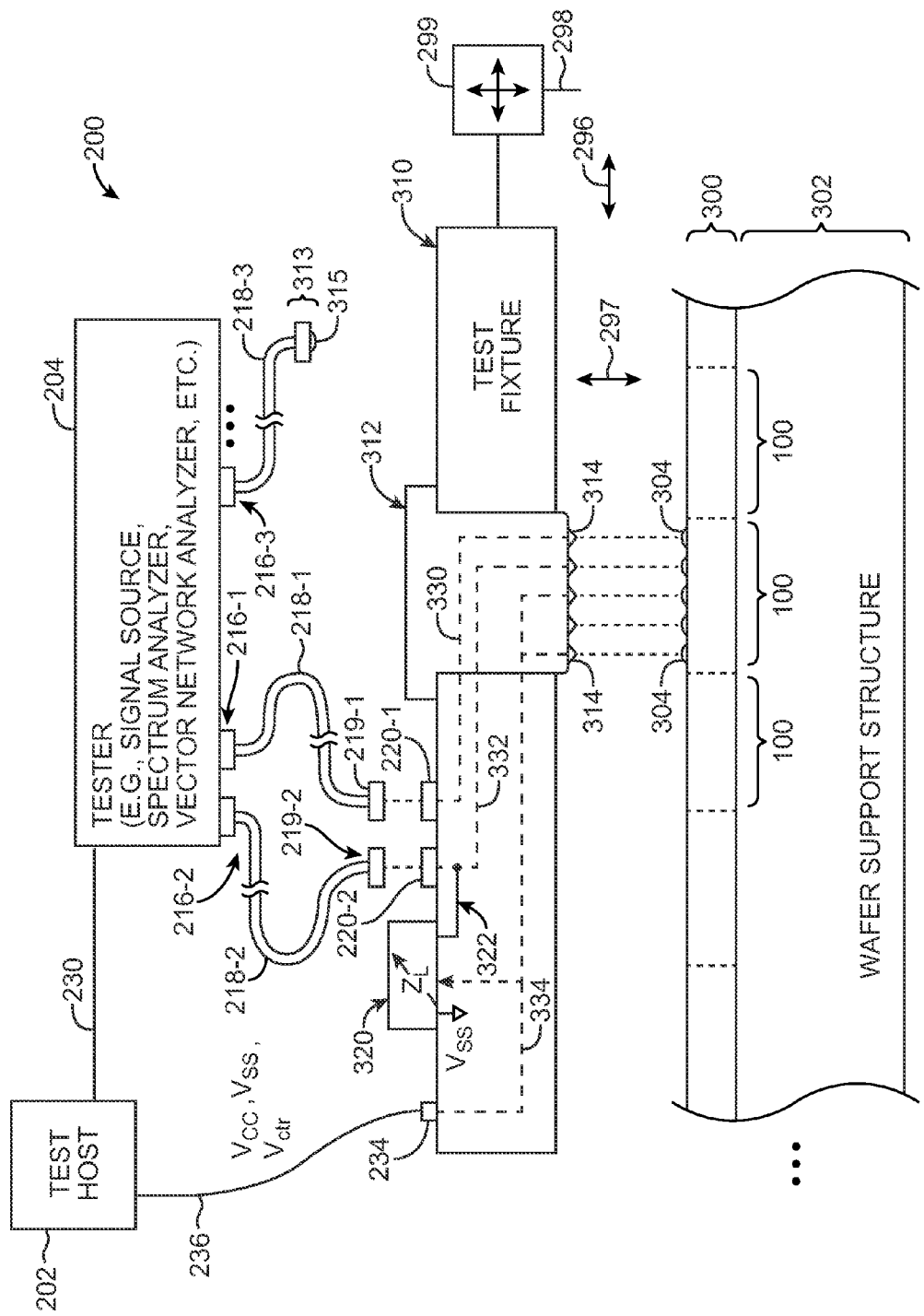
FIG. 7 is a diagram of an illustrative test system for performing wafer-level testing on a device under test containing an antenna tuning element in accordance with an embodiment of the present invention.

In accordance with an embodiment of the present invention, antenna tuning element 100 may be characterized using a test system such as test system 200 of FIG. 7. As shown in FIG. 7, test system 200 may be used to perform wafer-level testing on multiple antenna tuning elements 100 each of which is formed on a respective integrated circuit die (as an example) that is part of a semiconductor wafer 300. A die containing an antenna tuning element 100 that is being tested using test system 200 may be referred to as a device under test (DUT).

Test system 200 may include a test host such as test host 202 (e.g., a personal computer), a tester such as tester 204, test structures such as test fixture 310 and probing structure 312 (sometimes referred to as a test probe or test probe structure), a wafer holder such as wafer support structure 302, cabling, control circuitry, power supply circuitry, networking equipment, and other test equipment. Wafer 300 may be mounted on wafer support structure 302 during testing. Wafer support structure 302 may secure wafer 300 in a known fixed position during test operations. Test system 200 may use tester 204 and associated test structures to test each die on wafer 300 prior to dicing wafer 300 into separate dies and packaging each individual die.

Probing structure 312 may be supported by test fixture 310. Test fixture 310 may be a plastic support structure or other dielectric structure, a rigid printed circuit board substrate such as a fiberglass-filled epoxy substrate (e.g., FR4), or other substrate material. Probing structure 312 may, for example, be constructed using a flexible printed circuit ("flex circuit") formed from a sheet of polyimide or other flexible polymer, or other substrate material.

Probing structure 312 may include contacts such as conductive tips 314 configured to mate with corresponding solder bumps 304 (e.g., bumps sometimes referred to as controlled collapse chip connection (C4) bumps or "flip-chip" bumps) formed at the surface of a device under test. The position of test fixture 310 may be controlled using a positioner such as positioner 299. Positioner 299 may be a computer-controlled device (e.g., a positioning device that receives commands from test host 202 via path 298) or a manually-controlled positioning device having air-driven or motor-driven actuators for controlling the height of test probe structure 312 in direction 297 and for controlling the lateral movement of test probe structure 312 in direction 296.

A first probe tip 314 may be coupled to a first test connector 220-1 formed on fixture 310 via path 330. A second probe tip 314 may be coupled to a second test connector 220-2 formed on fixture 310 via path 332. At least third and fourth probe tips may be coupled to control connector 234 formed on fixture 310 via path 334. Paths 330, 332, and 334 may include conductive traces (e.g., traces that form microstrip transmission lines, stripline transmission lines, edge coupled microstrip transmission lines, edge coupled stripline transmission lines, or other suitable transmission line structures) that are formed within the substrate dielectric materials within test fixture 310 and within the flex circuit of probe structure 312. Test signals, control signals, power supply signals, and or other types of signals may be conveyed to and from the device under test via such types of traces that are coupled to probe tips 314.

The example of FIG. 7 in which test probe 312 includes five probe tips is merely illustrative. In general, test probe 312 may include at least ten probe tips, at least 100 probe tips, at least 1000 probe tips, or any suitable number of probe tips for interfacing with corresponding solder bumps associated with each integrated circuit die to be tested.

Control connector 234 may be coupled to test host 202 via path 236. During testing, test host 202 may supply power supply signals (e.g., positive power supply voltage Vcc and ground power supply voltage Vss) and control signals Vctr for configuring the state of antenna tuning element 100 to the device under test via path 236, connector 234, path 334, and associated probe tips 314.

The example of FIG. 7 in which power is supplied to the device under test is suitable for an antenna tuning element 100 that contains at least one active component (i.e., a electrical component that needs to be actively powered for proper operation). As an example, radio-frequency switch 152 of FIG. 6A may be an active component that needs to be powered during testing. In other arrangements, the device under test may not include active components. When DUT 100 only includes passive electrical components (e.g., resistors, capacitors, inductors, and/or other passive load elements), power needs not be supplied to the device under test.

Control signals Vctr may be used to place antenna tuning element 100 in respective desired states during testing. Consider a scenario in which a DUT includes a varactor of the type shown in FIG. 6B. During a first test iteration, test host 202 may send control signals to the DUT via path 236 that configure switch 154 to connect ports P1 and P2. During a second test iteration, test host 202 may send control signals to the DUT via path 236 that configure switch 154 to connect ports P1 and P3. During a third test iteration, test host 202 may send control signals to DUT 100 via path 236 that configure switch 154 to connect ports P1 and P4. It is generally desirable to characterize the DUT in a variety of potential operating states using test system 200.

Tester 204 may be used to generate radio-frequency test signals that are fed to the DUT via paths 330 and 332 and test cabling. Tester 204 may therefore sometimes be referred to as a radio-frequency tester. Radio-frequency tester 204 may, for example, be a vector network analyzer, a spectrum analyzer, a signal generator, or other types of signal source that is capable of producing test signals and making desired radio-frequency measurements on received test signals. Tester 204 may have a first port 216-1 to which a first radio-frequency cable 218-1 is connected and a second port 216-2 to which a second radio-frequency cable 218-2 is connected. Radio-frequency cables 218-1 and 218-2 may, for example, be coaxial cables. If desired, tester 204 may include at least a third port 216-3 to which a third radio-frequency cable 218-3 is connected, at least four total ports, etc.

In particular, first cable 218-1 may have a first end that is connected to tester port 216-1 and a second end terminating at a first radio-frequency connector 219-1. Similarly, second cable 218-2 may have a first end that is connected to tester port 216-2 and a second end terminating at a second radio-frequency connector 219-2. The first port 216-1 of tester 204 may be electrically connected to path 330 by mating connectors 219-1 and 220-1, whereas the second port 216-2 of tester 204 may be electrically connected to path 332 by mating connectors 219-2 and 220-2. Connectors 220-1 and 220-2 may be coaxial connectors such as SubMiniature version A (SMA) connectors that provide a 50 ohm termination impedance for radio-frequency signals up to 18 GHz (as an example). This is merely illustrative. If desired, other types of connectors such as SubMiniature version B (SMB) connectors, SubMiniature version C (SMC) connectors, Bayonet Neill-Concelman (BNC) connectors, U.FL connectors, and other types of connectors may be used in test system 200.

Connected using this arrangement, tester 204 may be configured to gather desired radio-frequency measurements such as radio-frequency two-port network parameters from DUT 100. Radio-frequency tester 204 may receive commands from test host 202 via path 230 that direct tester 204 to gather desired radio-frequency measurement. If desired, test data can be provided from tester 204 to test host 202 via path 230.

Radio-frequency tester 204 may be configured to produce radio-frequency test signals that are applied to the DUT via cables 218 (e.g., cables 218-1 and 218-2) and to the test structures (e.g., test fixture 310 and test probe 312). Even without being connected to other components to form a completed antenna assembly, the DUT may emit radio-frequency signals when being energized by the test signals generated using tester 204. As electromagnetic test signals are transmitted by tester 204 and applied to the DUT through test cable 218-1, corresponding emitted electromagnetic test signals may be received through test cable 218-2 (as an example). Tester 204 may also receive reflected signals via cable 218-1 (i.e., signals that were reflected from DUT 100 in response to the signals transmitted through test cable 218-1).

The reflected signals gathered in this way may be used to compute a reflection coefficient (sometimes referred to as an S11 parameter or S11 scattering parameter). The transmitted signals on cable 218-1 and corresponding received signals on cable 218-2 may be used to compute a forward transfer coefficient (sometimes referred to as an S21 parameter or S21 scattering parameter). The S11 and S21 data may include magnitude and phase components.

Similarly, tester 204 may also transmit test signals to DUT 100 through test cable 218-2. As test electromagnetic signals are transmitted by tester 204 and applied to DUT 100 through test cable 218-2, corresponding emitted electromagnetic test signals may be received through test cable 218-1. Tester 204 may also receive reflected signals via cable 218-2 (i.e., signals that were reflected from DUT 100 in response to the signals transmitted through test cable 218-2). The emitted and reflected signals gathered in this way may be used to compute reflection coefficient data (sometimes referred to as an S22 scattering parameter) and forward transfer coefficient data (sometimes referred to as an S12 scattering parameter).

Test host 202 may, for example, analyze the scattering parameter test data to determine whether antenna tuning element 100 satisfies design criteria. If the gathered test data deviates from a predetermined level by an unacceptable amount, the device currently being tested may be marked as defective. If the gathered test data deviates from the predetermined level by a tolerable amount, the device currently being tested may be marked as a passing device. The use of tester 204 for obtaining scattering parameter test data is merely illustrative and does not serve to limit the scope of the present invention. If desired, tester 204 may be used to gather other types of radio-frequency measurements such as hybrid (H) parameter values, inverse-hybrid (G) parameter values, cascaded (ABCD) parameter values, scattering transfer (T) parameter values, etc.

Test system 200 may be configured to emulate a true application environment for the DUT so that the DUT can be tested in a well-controlled system without actually being assembled within a form factor electronic device. The DUT may be tested in a series configuration or a shunt configuration. In the series configuration, terminal A of antenna tuning element 100 may be electrically coupled to port 216-1 of tester 204, whereas terminal B of element 100 may be electrically coupled to port 216-2 of tester 204 (as an example). In the shunt configuration, terminal A of element 100 may be electrically coupled to ports 216-1 and 216-2 of tester 204, whereas terminal B of element 100 may be grounded.

Whether the DUT is tested in the shunt or series configuration, an adjustable load circuit such as adjustable load circuit 320 that is mounted on fixture 310 may be electrically coupled to port 216-2 via path 322. Adjustable load circuit 320 may be controlled individually using test host 202 to provide desired impedance characteristics (e.g., circuit 320 may receive control signals from test host 202 via path 334 to emulate complex impedance characteristics ranging from an open circuit to a short circuit). In other words, test host 202 may place adjustable load circuit 320 in different states to help emulate different application environments similar to ones that antenna tuning element 100 would experience if placed in an assembled device 10 during normal user operation.

Test system 200 of FIG. 7 is merely illustrative and does not serve to limit the scope of the present invention. If desired, test system 200 may be used to test single-ended applications and/or differential-mode applications. If desired, test data gathered using tester 204 need not be limited to small signal scattering parameters but may include large signal measurements such as power measurements for signals at harmonic frequencies, harmonic distortion measurements, intermodulation distortion measurements, and/or other non-linear measurements. In other suitable arrangements, test fixture 310 may include more than one probing structure 312 so that multiple devices under test may be tested in parallel (e.g., to perform "multi-site" testing).

Figure 8:
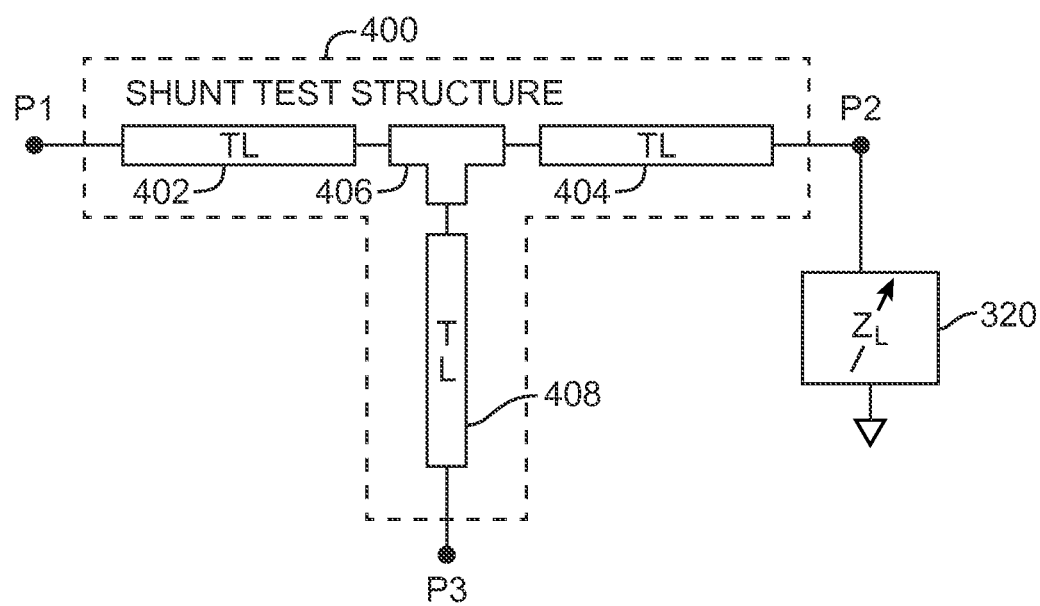
FIG. 8 is an equivalent circuit model of a shunt test structure in accordance with an embodiment of the present invention.

When test system 200 is being used to characterize a DUT in the shunt configuration, text fixture 310 and probing structure 310 may be referred to collectively as a shunt test structure 400. FIG. 8 is shows an equivalent circuit model of shunt test structure 400. As shown in FIG. 8, shunt test structure 400 may include a first port P1 corresponding to a first test reference point representing the interface at which connector 219-1 mates with connector 220-1, a second port P2 corresponding to a second test reference point representing the interface at which connector 219-2 mates with connector 220-2, and a third port P3 corresponding to a third test reference point representing the interface at which probe tips 314 contact solder bumps 304.

Shunt test structure 400 may be modeled using a T-junction 406 having first, second, and third terminals, a first transmission line 402 coupled between port P1 and the first terminal of T-junction 406, a second transmission line 404 coupled between port P2 and the second terminal of T-junction 406, and a third transmission line 408 coupled between port P3 and the third terminal of T-junction 406. First transmission line 402 may correspond to path 330, whereas second transmission line 404 may correspond to path 332. While testing a DUT in the shunt configuration, paths 330 and 332 may be shorted to each other, paths 330 and 332 may be coupled to a common test point 314, and/or paths 330 and 332 may be coupled to a common node on the DUT.

Figure 9:
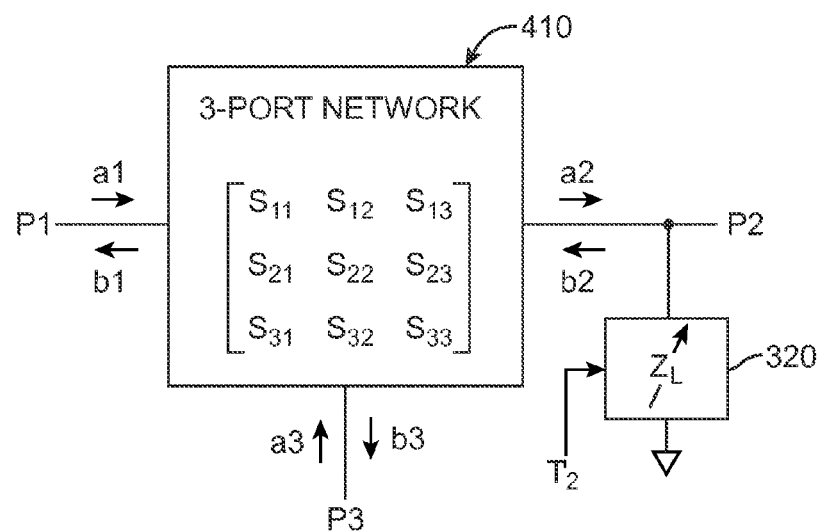
FIG. 9 is a diagram of a shunt test structure shown as an illustrative 3-port network in accordance with an embodiment of the present invention.

Shunt test structure 400 may be modeled as a 3-port network such as 3-port network 410 (see, e.g., FIG. 9). Three-port network 410 may, as an example, be described by a 3 by 3 matrix of complex numbers (referred to as 3-port scattering parameters) defined as follows:

$$\begin{bmatrix} b_1 \\ b_2 \\ b_3 \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} a_1 \\ a_2 \\ a_3 \end{bmatrix} \quad (1)$$

where $a_1$ is defined as the injected wave at port P1, where $a_2$ is defined as the injected wave at port P2, where $a_3$ is defined as the injected wave at port P3, where $b_1$ is defined as the reflected wave at port P1, where $b_2$ is defined as the reflected wave at port P2, and where $b_3$ is defined as the reflected wave at port P3. The 3-port scattering parameters $S_{11}$-$S_{33}$ (sometimes referred to collectively as S3P values) may be used to accurately describe the input-output impedance characteristics associated with each of ports P1-P3 and may be used to accurately describe the interactions between each pair of ports (e.g., to describe the forward and reverse transfer characteristics between any two ports selected from P1, P2, and P3).

Adjustable load circuit 320 may be coupled to port P2 to provide an adjustable impedance $Z_L$. A corresponding input reflection coefficient $\Gamma_2$ for port P2 when P2 is terminated with $Z_L$ may be computed using the following equation:

$$\Gamma_2 = \frac{a_2}{b_2} = \frac{Z_L - Z_0}{Z_L + Z_0} \quad (2)$$

where $Z_0$ is equal to a nominal terminal impedance of 50 ohms (as an example). This is merely illustrative. Impedance $Z_0$ may have a resistance value other than 50 ohms and may include any desired real and/or imaginary impedance values.

Figure 10:
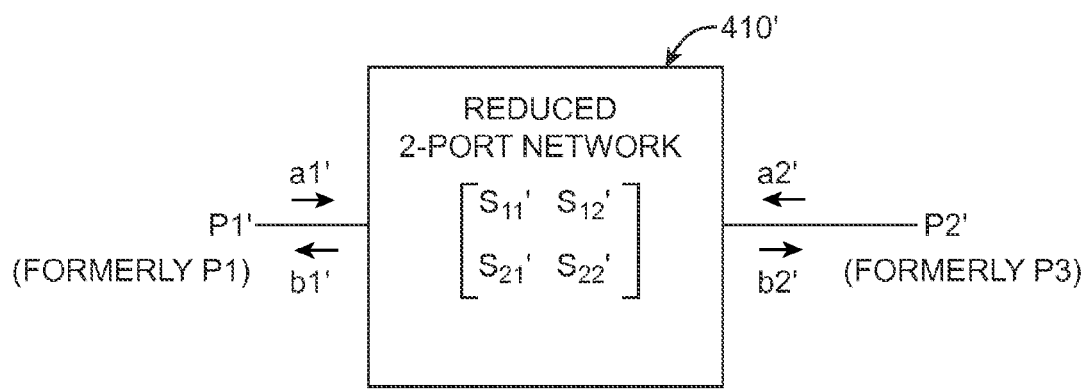
FIG. 10 is a diagram of a shunt test structure shown as an illustrative reduced 2-port network in accordance with an embodiment of the present invention.

When the reflection coefficient as seen by port P2 of test structure 400 is set to $\Gamma_2$ using adjustable load circuit 320, 3-port network 410 may be simplified into a reduced 2-port network 410' (see, e.g., FIG. 10). As shown in FIG. 10, 2-port network 410' may have a first port P1' (formerly port P1 of network 410) and a second port P2' (formerly port P3 of network 410). Substituting $a_2$ as a function of $\Gamma_2$ (see, equation 2) into the three-port S-parameter matrix in equation 1, the S-parameters for reduced 2-port network 410' may be calculated as follows:

$$\begin{bmatrix} b_1' \\ b_2' \end{bmatrix} = \begin{bmatrix} S_{11}' & S_{12}' \\ S_{21}' & S_{22}' \end{bmatrix} \begin{bmatrix} a_1' \\ a_2' \end{bmatrix} = \begin{bmatrix} S_{11} + \frac{S_{12}S_{21}\Gamma_2}{1 - S_{22}\Gamma_2} & S_{13} + \frac{S_{12}S_{23}\Gamma_2}{1 - S_{22}\Gamma_2} \\ S_{31} + \frac{S_{32}S_{21}\Gamma_2}{1 - S_{22}\Gamma_2} & S_{33} + \frac{S_{32}S_{23}\Gamma_2}{1 - S_{22}\Gamma_2} \end{bmatrix} \begin{bmatrix} a_1' \\ a_2' \end{bmatrix} \quad (3)$$

where $a_1'$ is defined as the injected wave at port P1', where $a_2'$ is defined as the injected wave at port P2', where $b_1'$ is defined as the reflected wave at port P1', where $b_2'$ is defined as the reflected wave at port P2', where $S_{11}'$-$S_{22}'$ are the 2-port scattering parameters associated with reduced 2-port network 410', and where $S_{11}$-$S_{33}$ are the 3-port scattering parameters associated with shunt test structure 400.

During testing, a device under test may be coupled to port P2' (e.g., by mating test probe 312 with the DUT) while tester 204 is used to apply voltage and current stimulus at port P1'. Tester 204 having a source impedance of $Z_G$ may be used to supply a source voltage of $V_G$ for applying a voltage V1 across positive and negative terminals associated with port P1' (and for applying an input current of $I_1'$ into port P1'). As an example, source impedance $Z_G$ may be equal to $Z_0$ (i.e., 50 ohms), $V_G$ may have a magnitude of 20 V, and $I_1'$ may be equal to 0.4 A.

It may be desirable to configure test system 200 so that reduced 2-port network 410' stimulated in this way can present desired voltage stress $V_2$ and current stress $I_2'$ to the device under test. Voltage and current stress applied to the device under test using test system 200 may serve to emulate the amount of stress that is experienced by an antenna tuning device 100 that is assembled within device 10 during normal wireless operation at desired frequencies.

The amount of voltage stress $V_2$ that is applied to a device under test may be computed as follows:

$$\frac{V_2}{V_G} = \frac{Z_{DUT}}{Z_{DUT} + Z_0} \frac{S_{21}'}{1 - S_{22}'\Gamma_{DUT}} \quad (4)$$

where $$\Gamma_{DUT} = \frac{Z_{DUT} - Z_0}{Z_{DUT} + Z_0} \quad (5)$$

As shown in equation 4, assuming $V_G$ has a fixed magnitude of 20 V, voltage $V_2$ is only a function of $Z_{DUT}$, $\Gamma_{DUT}$, $S_{21}'$, and $S_{22}'$. If $Z_{DUT}$ and $\Gamma_{DUT}$ are known values, different $Z_L$ values for adjustable load circuit 320 can be computed for the different desired voltage stress levels $V_2$ by substituting the expressions of $S_{21}'$ and $S_{22}'$ (that are both functions of $\Gamma_2$) as shown in equation 3 into equation 4, solving for $\Gamma_2$, and then solving for $Z_L$ based on equation 2.

Figure 12:
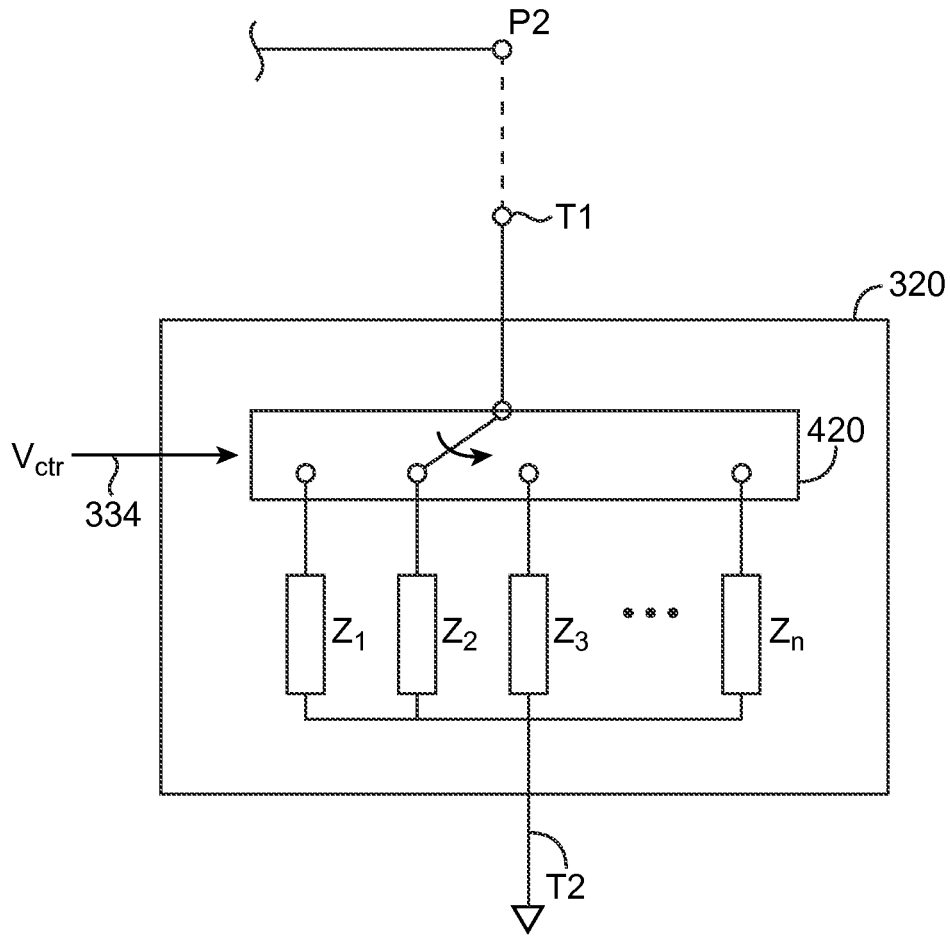
FIG. 12 is a circuit diagram of an illustrative adjustable load circuit in accordance with an embodiment of the present invention.

Adjustable load circuit 320 may include an array of different loading components having load values $Z_1$-$Z_n$ computed using this approach (see, e.g., FIG. 12). For example, adjustable load circuit 320 may include a first terminal T1 that may be coupled to port P2 of shunt test structure 400, a second terminal T2 that is shorted to ground, a single-pole multiple-throw switching circuit such as switch 420, and multiple load components coupled between switch 420 and terminal T2.

As an example, switch 420 may receive a first set of control signals Vctr from test host 202 via path 334 that configure switch 420 to couple a first loading component having an impedance value of $Z_1$ to port P2 while switching the other loading components out of use and while testing a device under test operating in a first frequency band. As another example, switch 420 may receive a second set of control signals Vctr from test host 202 via path 334 that configure switch 420 to couple a second loading component having an impedance value of $Z_2$ to port P2 while switching the other loading components out of use and while testing the device under test operating in a second frequency band. As another example, switch 420 may receive another set of control signals Vctr from test host 202 via path 334 that configure switch 420 to couple an $n^{th}$ loading component having an impedance value of $Z_n$ to port P2 while switching the other loading components out of use and while testing the device under test operating in a third frequency band. In general, adjustable load circuit 320 may be operable in a sufficient number of states so that the device under test is presented with the desired voltage/current stress levels at respective desired frequencies of operation.

Figure 13:
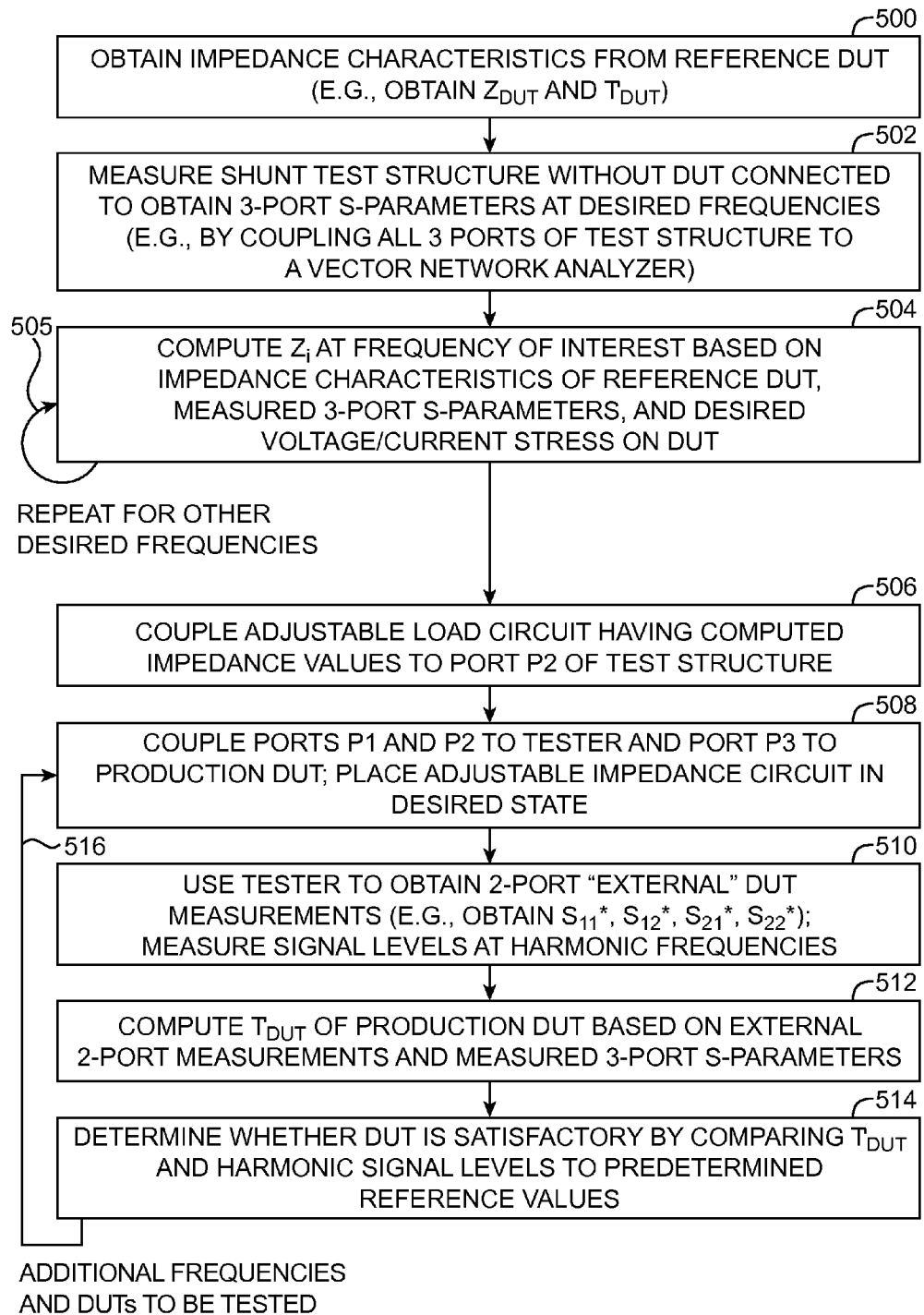
FIG. 13 is a flow chart of illustrative steps for testing a device under test arranged in a shunt configuration in accordance with an embodiment of the present invention.

FIG. 13 shows a flow chart of illustrative steps involved in using test system 200 to test a device under test arranged in a shunt configuration. At step 500, impedance characteristics may be obtained from a reference DUT (e.g., obtain $Z_{DUT}$ and $\Gamma_{DUT}$ associated with a reference DUT). Values $Z_{DUT}$ and $\Gamma_{DUT}$ associated with the reference DUT may be provided from a manufacturer of the reference DUT or may be measured using carefully calibrated test equipment from a golden reference DUT (i.e., from a DUT exhibiting reliable and satisfactory performance levels).

At step 502, 3-port scattering parameters $S_{11}$-$S_{33}$ may be obtained by measuring shunt test structure 400 without any DUT connected to port P3 (e.g., by coupling ports P1, P2, and P3 to corresponding ports in tester 204 and performing desired S-parameter measurements). For example, port P1 of shunt test structure 400 may be electrically coupled to port 216-1 of tester 204 via cable 218-1, port P2 of shunt test structure 400 may be electrically coupled to port 216-2 of tester 204 via cable 218-2, and port P3 of shunt test structure 400 may be electrically coupled to port 216-3 of tester 204 via cable 218-3 and contact probe 313 (e.g., a test probe having a contact tip portion 315 configured to mate with at least one solder bump 304 on the device under test).

Figure 11:
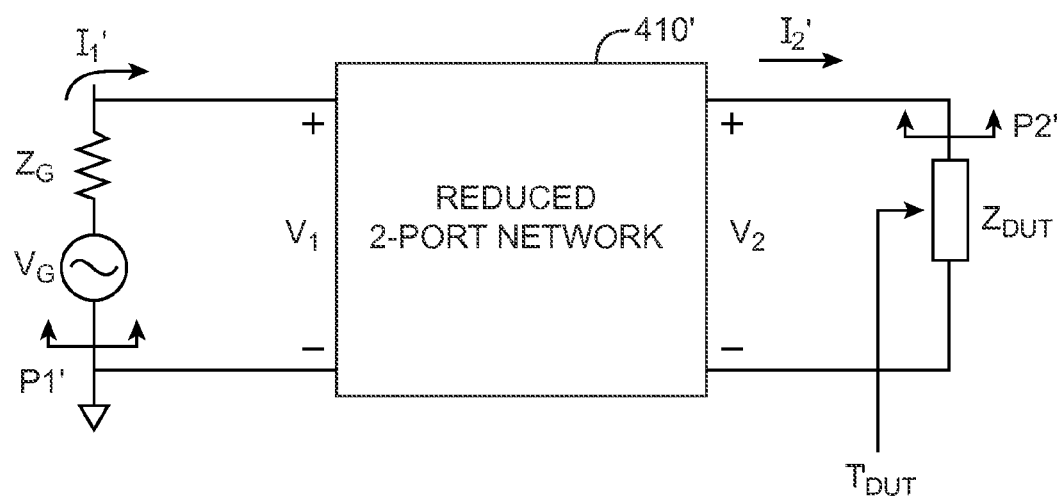
FIG. 11 is a diagram of a test system that is used for testing a device under test coupled in a shunt configuration and that is modeled using the reduced 2-port network of FIG. 10 in accordance with an embodiment of the present invention.

At step 504, a load value Zi may be computed for an operating frequency of interest based on the impedance characteristics associated with the reference DUT, the measured 3-port scattering parameters, and the desired voltage/current stress on the DUT (e.g., using at least equation 4 as described in connection with FIG. 11). Step 504 may be repeated to compute load values for other desired operating frequencies (as indicated by path 505).

At step 506, adjustable load circuit 320 that includes the different load values computed at step 504 may be coupled to port P2 of shunt test structure 400. At this point, test system 200 is ready for use in performing wafer-level testing on production antenna tuning elements 100.

At step 508, ports P1 and P2 of shunt test structure 400 may be coupled to tester 204 (e.g., by mating connectors 219-1 and 219-2 with connectors 220-1 and 220-2, respectively) while port P3 of test structure 400 is coupled to a production DUT (e.g., by mating probe tips 314 on probing structure 312 with corresponding solder bumps 304 on the device under test). Test host 202 may send control signals Vctr to adjustable load circuit 320 to place circuit 320 in the desired state (e.g., so that a desired current/voltage stress that emulates the amount of stress experienced by antenna tuning element 100 during normal device operation is presented to the device under test).

At step 510, tester 204 may be used to obtain "external" 2-port scattering parameters from the production DUT (e.g., to obtain $S_{11}^*$, $S_{12}^*$, $S_{21}^*$, and $S_{22}^*$) and may also be used to obtain signal level measurements at harmonic frequencies (e.g., at frequencies that are integer multiples of the current frequency under test).

At step 512, an input reflection $\Gamma_{DUT}$ of the production device currently under test may be extracted based on the external 2-port scattering parameter measurements obtained at step 510 (e.g., $S_{12}^*$, $S_{11}^*$, $S_{22}^*$, etc.) and the 3-port scattering parameter measurements obtained at step 502 (e.g., $S_{13}$, $S_{32}$, $S_{12}$, $S_{33}$, $S_{31}$, $S_{23}$, $S_{22}$, etc.) using the following equations:

$$\Gamma_{DUT} = \frac{\Gamma_1 \Gamma_2 \Gamma_3}{3} \quad (6)$$

where $$\Gamma_1 = \left( \frac{S_{13} S_{32}}{S_{12}^* - S_{12}} + S_{33} \right)^{-1} \quad (7)$$

$$\Gamma_2 = \left( \frac{S_{13} S_{31}}{S_{11}^* - S_{11}} + S_{33} \right)^{-1} \quad (8)$$

-continued $$\Gamma_3 = \left( \frac{S_{23} S_{32}}{S_{22}^* - S_{22}} + S_{33} \right)^{-1} \quad (9)$$

As shown in equation 6, $\Gamma_{DUT}$ may be computed by taking an average of $\Gamma_1$, $\Gamma_2$, and $\Gamma_3$ that are calculated using equations 7, 8, and 9, respectively. If desired, any one of $\Gamma_1$, $\Gamma_2$, and $\Gamma_3$ may be selected as $\Gamma_{DUT}$. Computing an average as shown in equation 6 may help improve the accuracy of $\Gamma_{DUT}$. Computing $\Gamma_{DUT}$ in this way serves to effectively de-embed (or remove) the effects associated with shunt test structure 400 from the external measurements while the device under test is presented with the desired voltage and current stress at the currently tested frequency of interest. Impedance $Z_{DUT}$ of the production device currently under test may be computed based on $\Gamma_{DUT}$.

At step 514, the extracted $\Gamma_{DUT}$ (or $Z_{DUT}$) and the harmonic signal levels obtained from the production DUT may be compared to predetermined reference values to determine whether the device under test is satisfactory. If the extracted $\Gamma_{DUT}$ deviates from the a predetermined target value by more than a tolerable amount and/or if the harmonic signal levels exceed a predetermined threshold, the shunt antenna tuning element 100 currently under test may be marked as a defective/faulty component. If the extracted $\Gamma_{DUT}$ is sufficiently close to the predetermined target value and/or if the harmonic signal levels are less than the predetermined threshold, the shunt antenna tuning element 100 currently under test may be marked as a passing component. Processing may proceed to step 508 to test the device under test at a new frequency (e.g., by placing adjustable load circuit 320 in the appropriate state) or to test another device under test on the same wafer 300 (e.g., by moving test fixture 310 laterally with positioner 299).

Figure 14:
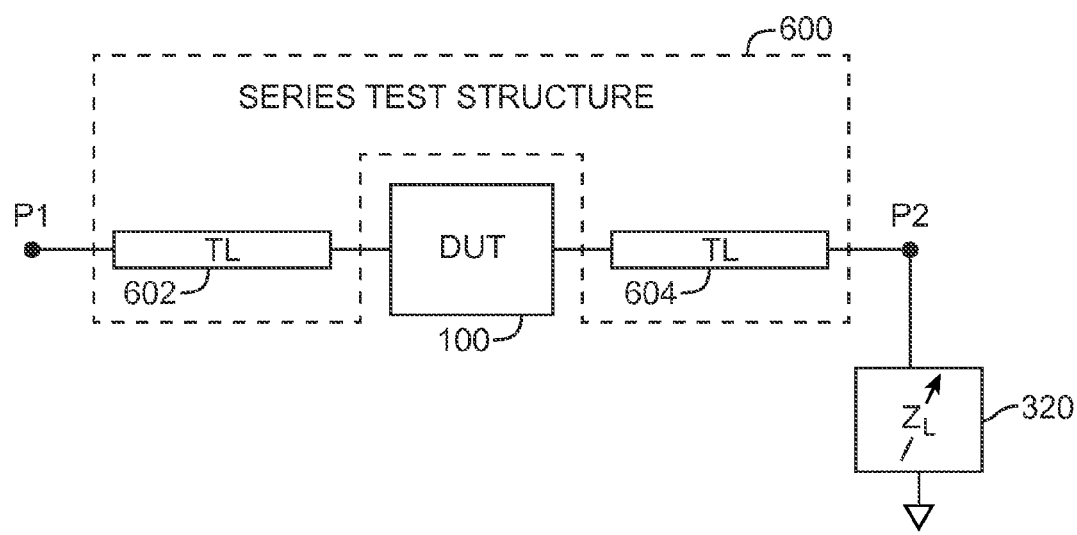
FIG. 14 is an equivalent circuit model a series test structure in accordance with an embodiment of the present invention.

In another suitable embodiment, test system 200 may be used to test a device under test connected in a series configuration. When test system 200 is being used to characterize a DUT in the series configuration, text fixture 310 and probing structure 310 may be referred to collectively as a series test structure 600. FIG. 14 shows an equivalent circuit model of series test structure 600. As shown in FIG. 14, series test structure 600 may include a first transmission line 602 that is coupled to port P1 (e.g., a first port corresponding to a first test reference point representing the interface at which connector 219-1 mates with connector 220-1) and a second transmission line 604 that is coupled to port P2 (e.g., a second port P2 corresponding to a second test reference point representing the interface at which connector 219-2 mates with connector 220-2). First transmission line 602 may correspond to path 330, whereas second transmission line 604 may correspond to path 332 (see, FIG. 7). A device currently being tested may be coupled between transmission lines 602 and 604 and may sometimes be considered as part of the series test structure 600.

Figure 15:
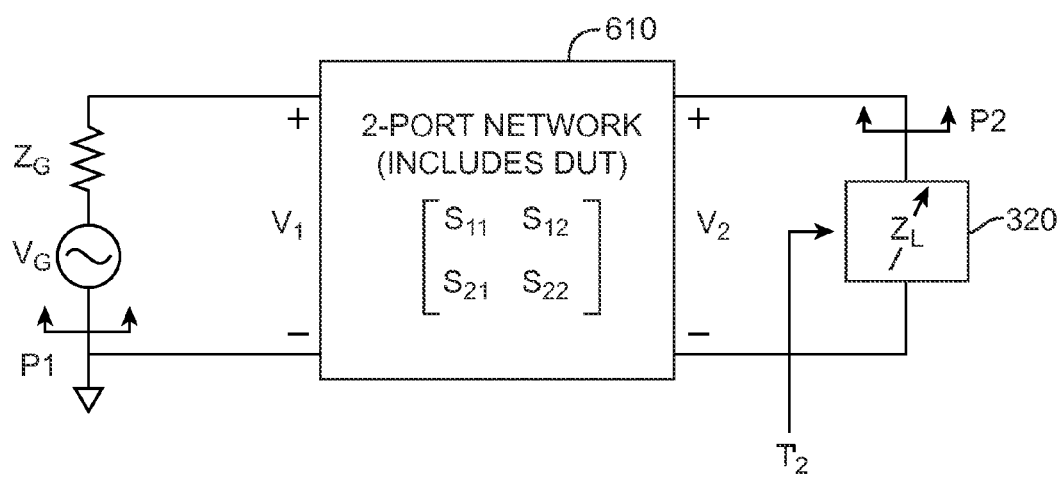
FIG. 15 is a diagram of a test system that is used for testing a device under test coupled in a series configuration and that is modeled using a 2-port network in accordance with an embodiment of the present invention.

During series testing, a production DUT may be coupled between ports P1 and P2 (e.g., by mating probing structure 312 with the DUT) while tester 204 is used to apply voltage and current stimulus at port P1 (see, 2-port network 610 of FIG. 15). Tester 204 having a source impedance of $Z_G$ may be used to supply a source voltage of $V_G$ for applying a voltage V1 across positive and negative terminals associated with port P11. As an example, source impedance $Z_G$ may be equal to $Z_0$ (i.e., 50 ohms), and $V_G$ may have a magnitude of 20 V.

As shown in FIGS. 14 and 15, adjustable load circuit 320 may be coupled to port P2 and may receive voltage $V_2$ from port P2.

It may be desirable to configure test system 200 so that 2-port network 610 stimulated in this way can present a desired voltage stress to the device under test. Since the device under test is connected in series between port P1 and P2, the voltage stress that is applied to the device under test may be equal to $\Delta V$, where $\Delta V$ is equal to $V_2$ minus $V_1$. The amount of voltage stress $\Delta V$ that is applied to the device under test using test system 200 in this way should emulate the amount of stress that is experienced by an antenna tuning device 100 that is assembled within device 10 during normal wireless operation at desired frequencies.

The amount of voltage stress $V_2$ that is applied to a device under test may be computed based on the following equation:

$$\frac{\Delta V}{V_G} = \frac{V_2 - V_1}{V_G} = \left(\frac{Z_L}{Z_L + Z_0} - \frac{S_{12}\Gamma_2}{2}\right)\left(\frac{S_{21}}{1 - S_{22}\Gamma_2}\right) - \frac{1 + S_{11}}{2} \quad (10)$$

where $$\Gamma_2 = \frac{Z_L - Z_0}{Z_L + Z_0} \quad (11)$$

As shown in equation 10, assuming $V_G$ has a fixed magnitude of 20V, voltage stress $\Delta V$ is only a function of $Z_L$, $\Gamma_2$, $S_{11}$, $S_{12}$, $S_{21}$, and $S_{22}$, where $S_{11}$-$S_{22}$ are equal to the 2-port scattering parameter values for series test structure 600 including the series-connected DUT. If parameters $S_{11}$-$S_{22}$ for series test structure 600 containing a reference DUT are known, different $Z_L$ values for adjustable load circuit 320 can be computed for different desired voltage stress levels $\Delta V$ by substituting the expression of $\Gamma_2$ (which is a function of $Z_L$) as shown in equation 11 into equation 10, and solving for $Z_L$.

Adjustable load circuit 320 may include components each of which exhibits a computed load impedance value Zi corresponding to an operating frequency of interest (FIG. 12). In general, adjustable load circuit 320 may be operable in a sufficient number of states so that the device under test will experience the desired amount of voltage stress at respective desired frequencies of operation.

Figure 16:
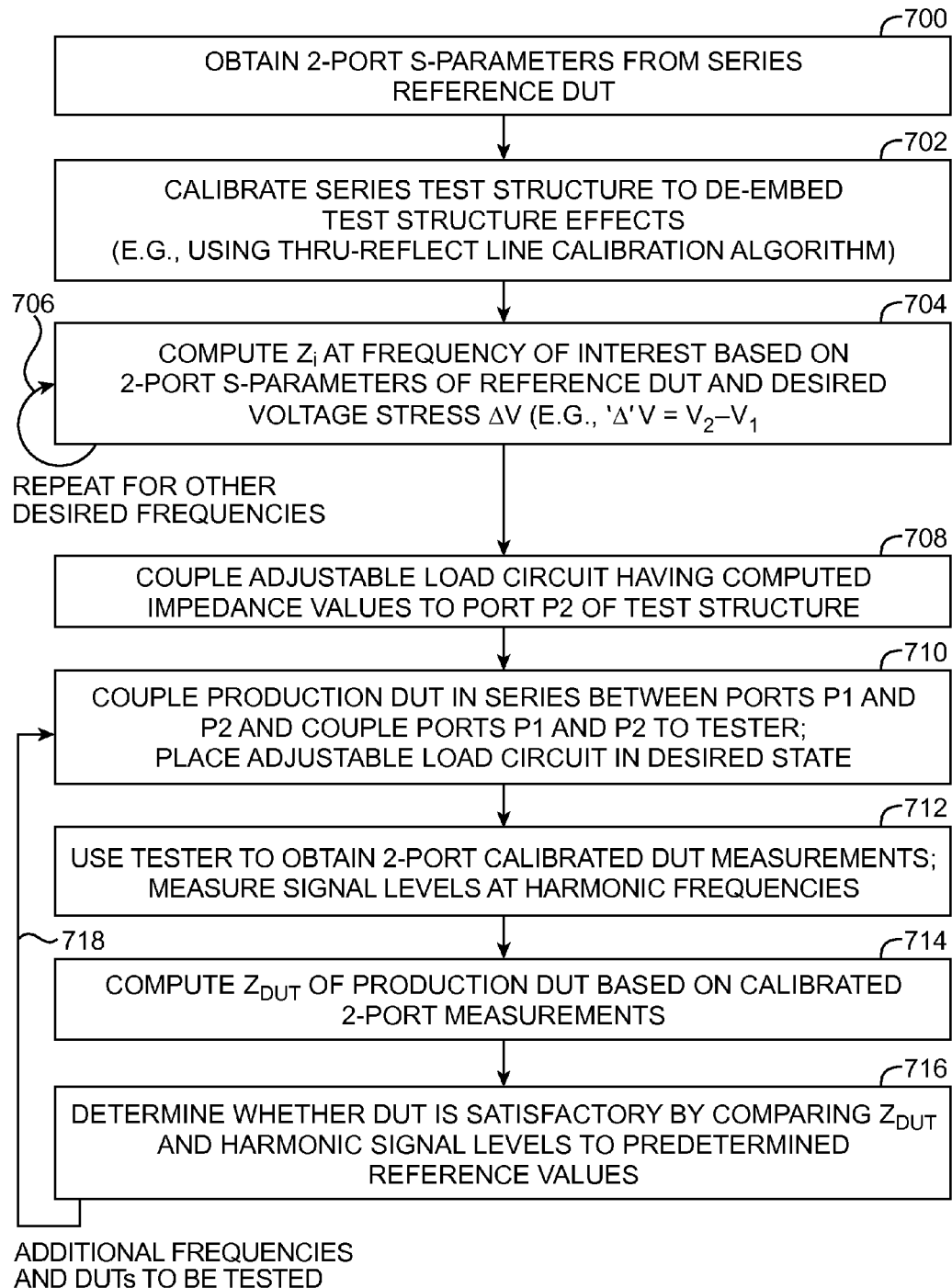
FIG. 16 is a flow chart of illustrative steps for testing a device under test arranged in a series configuration in accordance with an embodiment of the present invention.

FIG. 16 shows a flow chart of illustrative steps involved in using test system 200 to test a device under test arranged in a series configuration. At step 700, 2-port scattering parameters may be obtained from series test structure 600 (e.g., by placing a reference DUT in series between ports P1 and P2 of series test structure 600 and measuring corresponding 2-port scattering parameters using test host 202). The reference DUT may then be decoupled from series test structure 600.

At step 702, series test structure 600 may then be calibrated to de-embed systematic effects that are associated with transmission lines 602 and 604. In one suitable arrangement, test board 210 may be calibrated using a THRU-REFLECT-LINE (TRL) approach. The TRL approach is a two-port calibration procedure that relies on testing different transmission line structures on a substrate to fully characterize systematic errors associated with the substrate.

At step 704, a load value Zi may be computed for an operating frequency of interest based on the 2-port scattering parameters measured from the reference DUT and the desired voltage stress on the series-connected DUT (e.g., using at least equation 10 as described in connection with FIG. 15). Step 704 may be repeated to compute load values for other desired operating frequencies, as indicated by path 706.

At step 708, adjustable load circuit 320 having different load components exhibiting the load values computed at step 704 may be coupled to port P2 of series test structure 600. At this point, test system 200 is ready for use in performing wafer-level testing on a production DUT.

At step 710, ports P1 and P2 of series test structure 400 may be coupled to tester 204 (e.g., by mating connectors 219-1 and 219-2 with connectors 220-1 and 220-2, respectively) while a production DUT is coupled in series between transmission lines 602 and 604 of structure 600 (e.g., by mating probe tips on structure 312 with corresponding solder bumps on the device under test). Test host 202 may send control signals Vctr to adjustable load circuit 320 to place circuit 320 in the desired state (e.g., so that the desired voltage stress $\Delta V$ emulating the amount of stress experienced by a series antenna tuning element 100 during normal device operation is presented to the device under test).

At step 712, tester 204 may be used to obtain 2-port calibrated scattering parameters from the DUT and may also be used to obtain signal level measurements at harmonic frequencies (e.g., at frequencies that are integer multiples of the fundamental frequency at which the 2-port S-parameters are measured). The scattering parameters obtained during step 712 may already have test structure effects de-embedded since the test structure effects have been calibrated out at step 700.

At step 714, two-port Z-parameters $Z_{DUT}$ or Y-parameters $Y_{DUT}$ of the production device currently under test may be computed based on the calibrated 2-port scattering parameter measurements obtained from step 712. Z or Y parameters can be used to derive equivalent circuit parameters such as resistance, capacitance and inductance of the DUT.

At step 716, the computed $Z_{DUT}$ and the harmonic signal levels obtained from the device under test may be compared to predetermined reference values to determine whether the device under test is satisfactory. If the computed $Z_{DUT}$ deviates from a predetermined target value by more than a tolerable amount and/or the harmonic signal levels exceed a predetermined threshold, the series antenna tuning element 100 currently under test may be marked as a defective/faulty component. If the computed $Z_{DUT}$ is sufficiently close to the predetermined target value and/or if the harmonic signal levels are less than the predetermined threshold, the series antenna tuning element 100 currently under test may be marked as a passing component. Processing may proceed to step 708 to test the device under test at a new frequency (e.g., by placing adjustable load circuit 320 in the appropriate state) or to test another device under test on the same wafer (e.g., by moving test fixture 310 laterally with positioner 299).

The steps shown in FIGS. 13 and 16 for performing wafer-level testing on antenna tuning elements 100 configured in the shunt and series arrangement are merely illustrative and do not serve to limit the scope of the present invention. In either scenario, tester 204 may be pre-calibrated to remove potential errors that are associated with tester 204 and coaxial cables 218 (i.e., cables 218-1, 218-2, and 218-3).

For example, a vector network analyzer 204 may be calibrated at the coaxial ports using known coaxial standards (e.g., using conventional open, short, load and thru coaxial standards) to ensure that vector network analyzer 204 is initialized to desired test settings. Once this step is complete, measurements gathered using tester 204 will only reflect the behavior of structures coupled to the ends of coaxial cables 218 (e.g., ports 216-1 and 216-2 of tester 204 are virtually extended to the ends of cables 218 so that a new test reference plane is established).

Equations 1-11 are merely illustrative. Other suitable ways for extracting $Z_{DUT}$ or $\Gamma_{DUT}$ may be employed (e.g., by performing computations and/or measurements based on hybrid (H) parameter values, inverse-hybrid (G) parameter values, cascaded (ABCD) parameter values, scattering transfer (T) parameter values, and other two-port network parameters).

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using a test system to test a device under test, wherein the test system includes a tester and a test structure having at least first and second ports, the method comprising:
   coupling the device under test to the first and second ports;
   providing a predetermined amount of voltage stress to the device under test by placing an adjustable load circuit that is coupled to the second port in a selected state;
   with a test host in the test system, adjusting the adjustable load circuit by sending control signals to the adjustable load circuit via the test structure; and
   while the adjustable load circuit is placed in the selected state, sending radio-frequency test signals to the device under test via the first and second ports with the tester.

2. The method defined in claim 1, wherein the device under test comprises an antenna tuning element selected from the group consisting of: a radio-frequency switch, a tunable resistive component, a tunable capacitive component, and a tunable inductive component.

3. The method defined in claim 2, further comprising:
   with a computer-controlled positioner, moving the probing structure laterally to a new location to test another die in the plurality of dies on the semiconductor wafer.

4. The method defined in claim 1, wherein the device under test includes first and second terminals, and wherein coupling the device under test to the first and second ports comprises:
   coupling the first terminal of the device under test to at least the first port of the test structure; and
   coupling the second terminal of the device under test to ground.

5. The method defined in claim 1, wherein the device under test includes first and second terminals, and wherein coupling the device under test to the first and second ports comprises coupling the first terminal of device under test to the first port and coupling the second terminal of the device under test to the second port so that the device under test is coupled in series between the first and second ports.

6. The method defined in claim 1, further comprising:
   calibrating the tester to remove systematic errors associated with the tester.

7. The method defined in claim 1, wherein the device under test comprises one die in a plurality of dies on a semiconductor wafer, wherein the test structure includes a probing structure with contacts that are electrically coupled to the first and second ports, and wherein coupling the device under test to the first and second ports comprises mating the contacts of the probing structure with corresponding solder bumps on the device under test.

8. The method defined in claim 1, further comprising:
   with the tester, gather scattering parameter data from the device under test.

9. The method defined in claim 1, further comprising:
   with the tester, measuring harmonic signal levels from the device under test.

10. A method for operating a test system to test a device under test, wherein the test system includes a tester and a test structure, the method comprising:
    mating the device under test with the test structure;
    with the tester, sending radio-frequency test signals in a first radio-frequency band to the device under test via the test structure;
    while the tester is sending radio-frequency test signals in the first radio-frequency band to the device under test, placing an adjustable load circuit that is coupled to the test structure in a first state so that the device under test is presented with a first predetermined amount of voltage stress that emulates a first stress level that the device under test experiences during normal device operation in the first radio-frequency band;
    with the tester, sending radio-frequency test signals in a second radio-frequency band to the device under test via the test structure; and
    while the tester is sending radio-frequency test signals in the second radio-frequency band to the device under test, placing the adjustable load circuit in a second state so that the device under test is presented with a second predetermined amount of voltage stress that emulates a second stress level that the device under test experiences during normal device operation in the second radio-frequency band, wherein the second stress level is different than the first stress level.

11. The method defined in claim 10, wherein the device under test comprises an antenna tuning element.

12. The method defined in claim 10, wherein the test structure includes first and second ports, wherein the adjustable load circuit is coupled to the second port, and wherein mating the device under test to the test structure comprising coupling the device under test between the first port and a ground power supply terminal.

13. The method defined in claim 10, wherein the test structure includes first and second ports, wherein the adjustable load circuit is coupled to the second port, and wherein mating the device under test to the test structure comprising coupling the device under test in series between the first and second ports.

* * * * *